(12) United States Patent
Hasebe (10) Patent No.: US 12,315,275 B2
(45) Date of Patent: May 27, 2025

(54) IMAGE PROCESSING METHOD AND CLASSIFICATION MODEL CONSTRUCTION METHOD

(71) Applicant: SCREEN HOLDINGS CO., LTD., Kyoto (JP)

(72) Inventor: Ryo Hasebe, Kyoto (JP)

(73) Assignee: SCREEN HOLDINGS CO., LTD., Kyoto (JP)

( * ) Notice: Subject to any disclaimer, the term of this patent is extended or adjusted under 35 U.S.C. 154(b) by 327 days.

(21) Appl. No.: 17/871,342

(22) Filed: Jul. 22, 2022

(65) Prior Publication Data

US 2023/0031698 A1 Feb. 2, 2023

(30) Foreign Application Priority Data

Jul. 30, 2021 (JP) ................................. 2021-125159

(51) Int. Cl.
*G06V 20/69* (2022.01)
*G06V 10/26* (2022.01)
*G06V 10/764* (2022.01)
*G06V 10/774* (2022.01)
*G06V 10/776* (2022.01)

(52) U.S. Cl.
CPC ............ *G06V 20/695* (2022.01); *G06V 10/26* (2022.01); *G06V 10/764* (2022.01); *G06V 10/774* (2022.01); *G06V 10/776* (2022.01); *G06V 20/698* (2022.01)

(58) Field of Classification Search
CPC .... G06V 20/695; G06V 10/26; G06V 10/764; G06V 10/774; G06V 10/776; G06V 20/698; G06V 10/22; G06V 10/28; G06V 10/7747
See application file for complete search history.

(56) References Cited

U.S. PATENT DOCUMENTS

2020/0134355 A1 4/2020 Shinoda et al.
2021/0004699 A1* 1/2021 Okuno ................... G06N 20/20

FOREIGN PATENT DOCUMENTS

JP 2018-163248 A 10/2018
JP 2018-163249 A 10/2018
(Continued)

OTHER PUBLICATIONS

Automated Training of DCNN, Sadanandan et al, 2017; https://www.nature.com/articles/s41598-017-07599-6#Fig1 (Year: 2017).*
(Continued)

*Primary Examiner* — Jianxun Yang
(74) *Attorney, Agent, or Firm* — Rimon P.C.

(57) ABSTRACT

An image processing method according to the invention includes obtaining a ground truth image teaching a cell region occupied by a cell in an original image for each of a plurality of the original images obtained by bright-field imaging of the cell, generating a reverse image by reversing luminance of the original image at least for the cell region based on each original image, and constructing a classification model by performing machine learning using a set of the original image and the ground truth image corresponding to the original image and a set of the reverse image and the ground truth image corresponding to the original image as a basis of the reverse image respectively as training data.

10 Claims, 9 Drawing Sheets

(56) References Cited

FOREIGN PATENT DOCUMENTS

| JP | 2018-163524 A | 10/2018 |
|----|---------------|---------|
| KR | 10-2019-0119469 A | 10/2019 |

OTHER PUBLICATIONS

Extended European Search Report issued in corresponding European Patent Application No. 22185108.2-1207, dated Dec. 2, 2022.
Sajith Kecheril Sadanandan et al: "Automated Training of Deep Convolutional Neural Networks for Cell Segmentation", Scientific Reports, vol. 7, No. 1, Aug. 10, 2017.
Nik Dennler et al: "Learning-based Defect Recognition for Quasi-Periodic Microscope Images", arxiv.org, Cornell University Library, 201 Olin Library Cornell University Ithaca, NY 14853, Aug. 9, 2020.
Anonymous: "Bright-field microscopy—Wikipedia", Jul. 28, 2021 (Jul. 28, 2021), XP093001265, Retrieved from the Internet: URL:https://en.wikipedia.org/w/index.php?title=Bright-field_microscopy&oldid=1035886 618 [retrieved on Nov. 23, 2022].
Notice of Reasons for Refusal received in corresponding Japanese Patent Application No. 2021-125159, dated Mar. 25, 2025.

\* cited by examiner

IMAGE PROCESSING METHOD AND CLASSIFICATION MODEL CONSTRUCTION METHOD

CROSS REFERENCE TO RELATED APPLICATION

The disclosure of Japanese Patent Application No. 2021-125159 filed on Jul. 30, 2021 including specification, drawings and claims is incorporated herein by reference in its entirety.

BACKGROUND OF THE INVENTION

1. Field of the Invention

This invention relates to an image processing method for specifying a region occupied by a cell from an image obtained by imaging the cell and a classification model construction method for performing the imaging processing method using a machine learning algorithm.

2. Description of the Related Art

In medical and bioscience experiments, a cell to be observed is imaged by a CCD camera or the like to obtain digital image data and various image processing techniques are applied to the image data for observation and analysis. For example, a multitude of images obtained by imaging cells are collected as training images and applied to a classification model together with ground truth images teaching regions occupied by the cells in the training images for machine learning. By so doing, it is possible to construct the classification model having a function of automatically extracting a region occupied by a cell from a newly given test image.

If an image obtained by imaging a cell is a bright field image, e.g. an image obtained by bright field imaging using an optical microscope, a cell is nearly transparent. Thus, an image of the cell is not necessarily clear in an image in a focused state. Rather, the visibility of the cell may be better in an image captured under a condition slightly deviated from the focused state. For example, if cells to be imaged are two-dimensionally cultured (planar-cultured), contrast between edge parts and inner parts of the cells is known to be reversed depending on a focus position at the time of imaging (see, for example, JP 2018-163248A). Specifically, there are a case where the edge parts of the cells become bright, i.e. have a high luminance and the inner parts become darker, i.e. have a low luminance (hereinafter, referred to as a first contrast state") and a case where the edge parts become dark and the inner parts become brighter (hereinafter, referred to as a second contrast state").

Two types of images having different contrast states in this way can be both said to be suitable for the observation of cells. Which image is to be obtained is appropriately determined mainly according to a photographer's taste, an environment at the time of imaging and the like. Further, depending on a state of a specimen at the time of imaging, two kinds of the contrast states described above are possibly mixed in an image.

It is considered to collect a multitude of images obtained in this way and use these images as training images for constructing the classification model for automatically extracting the cell region described above. In that case, the contrast state of each training image is possibly the case of the first contrast state or the case of the second contrast state described above. Further, a test image as an object for the automatic extraction processing is also possibly in a case where the contrast state is the first contrast state or in a case where the contrast state is the second contrast state.

If the training images used in machine learning include many images captured in the same contrast state as the test image, automatic extraction by the classification model is expected to function with high accuracy. Otherwise, extraction accuracy is reduced. Further, regardless of in which contrast state the test image was captured, it is more preferable to obtain equal accuracy.

From these, images captured in two contrast states are desirably uniformly collected as training images. If imaging is newly performed in preparing training images, it can be dealt with by performing imaging in view of this point. However, a workload for collecting the training images by imaging a multitude of specimens while realizing two focused states becomes enormous. On the other hand, the workload can be drastically reduced if images captured in the past can be used as a library. However, a library uniformly including images in two contrast states cannot be always prepared.

SUMMARY OF THE INVENTION

This invention was developed in view of the above problem and aims to provide a technique capable of constructing a classification model capable of accurately extracting a cell region in an image from any of two types of bright field images having different contrast states.

To achieve the above object, one aspect according to this invention is directed to an image processing method including obtaining a ground truth image teaching a cell region occupied by a cell in an original image for each of a plurality of the original images obtained by bright-field imaging of the cell, generating a reverse image by reversing luminance of the original image at least for the cell region based on each original image, and constructing a classification model by performing machine learning using a set of the original image and the ground truth image corresponding to the original image and a set of the reverse image and the ground truth image corresponding to the original image as a basis of the reverse image respectively as training data.

Further, to achieve the above object, another aspect according to this invention is directed to a classification model construction method for specifying regions occupied by two-dimensionally cultured cells from a bright field image of the cells, the classification model construction method including obtaining a ground truth image teaching cell regions occupied by cells in an original image for each of a plurality of the original images obtained by bright-field imaging of the cells, generating a reverse image by reversing luminance of the original image at least for the cell regions based on each original image, and constructing a classification model by performing machine learning using a set of the original image and the ground truth image corresponding to the original image and a set of the reverse image and the ground truth image corresponding to the original image as a basis of the reverse image respectively as training data.

In the invention thus configured, it is possible to construct the classification model capable of accurately extracting the cell regions in the image regardless of in which of two contrast states each of the original images collected to be used as training images is. Further, regardless of in which of the two contrast states an input image input as a cell region extraction object to the classification model is, a good extraction result can be obtained. The reason for that is as follows.

As described above, the two contrast states are present in images obtained by bright-field imaging of cells. Specifically, in the first contrast state, edge (contour) parts of the cells are bright and inner parts are darker. Contrary to this, in the second contrast state, edge parts are dark and inner parts are brighter. As just described, an image contrast relationship between the edge parts and the inner parts of the cells is symmetrical between the two contrast states.

From this, it is expected to be possible to convert the two contrast states into each other if the luminance of the image is reversed. That is, it is possible to generate a reverse image expressing the other contrast state in a pseudo manner from the original image in one contrast state. Such a simple reverse image is not necessarily suitable for cell observation. However, it has been confirmed by an experiment of the inventors of this application that such a reverse image is sufficiently effective as a training image for constructing the classification model.

The original image is obtained to construct the classification model for automatically extracting a cell region from a bright field image and is paired with a ground truth image teaching the cell region in the original image. In principle, the region occupied by the cell is the same between the original image and the reverse image. That is, the ground truth image also teaches the cell region in the reverse image.

Accordingly, the set of the original image and the ground truth image and the set of the reverse image and the ground truth image can be respectively handled as pieces of the training data corresponding to the same cell and having mutually different contrast states. In this way, case examples serving as the training data can be made abundant and case examples in the two contrast states can be uniformly collected. By performing machine learning using the training data collected in this way, the constructed classification model has generalization performance capable of dealing with input images in either contrast state. That is, the classification model can be constructed which can accurately extract a cell region from an arbitrary input image.

Note that such a contrast reversal is a phenomenon in the cell region. Accordingly, it is sufficient to reverse the luminance at least in the cell region, out of the original image, in generating the reverse image. Since the cell region in the original image is taught as the ground truth image, it is also possible to selectively reverse only the cell region, out of the original image.

Further, in the above method, in which contrast state the original image and the input image were captured is not distinguished. Accordingly, in which contrast state imaging was performed needs not be distinguished in collecting the training images and capturing the input image. Further, even an image in which the two contrast states are mixed can be used as an original image for classification model construction and as an input image to the constructed classification model.

According to this invention, machine learning is performed by reversing at least a region taught as a cell region, out of an original image obtained as a training image, and using a reverse image as a training image together with the original image. By so doing, it is possible to construct a classification model capable of accurately extracting a cell region in an image from any of two types of bright field images having different contrast states. Further, the thus constructed classification model can accurately extract a cell region from an input image, regardless of in which contrast state the input image was captured.

The above and further objects and novel features of the invention will more fully appear from the following detailed description when the same is read in connection with the accompanying drawing. It is to be expressly understood, however, that the drawing is for purpose of illustration only and is not intended as a definition of the limits of the invention.

DETAILED DESCRIPTION OF THE PREFERRED EMBODIMENTS

Figure 1:
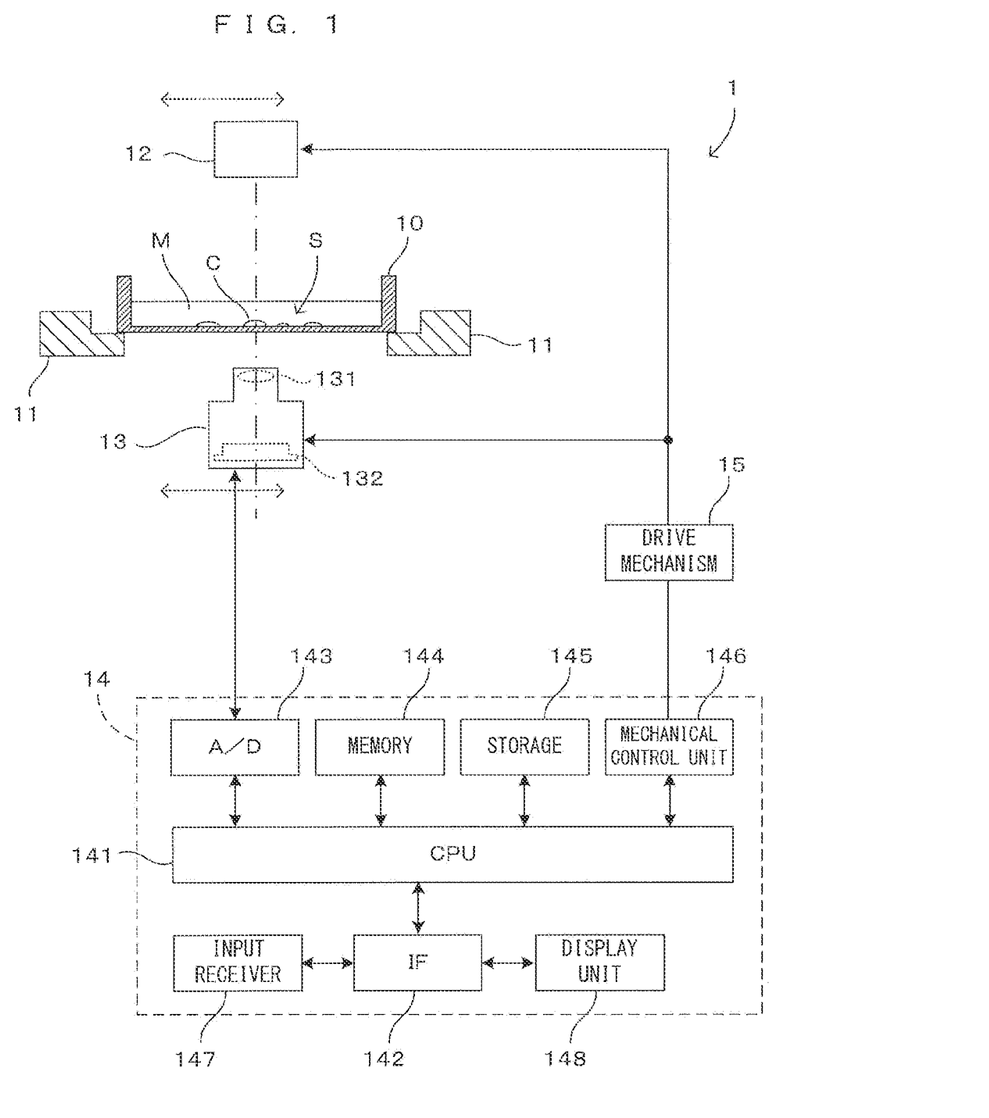
FIG. 1 is a view showing a schematic configuration of one embodiment of an imaging apparatus capable of performing an image processing method.

FIG. 1 is a diagram showing a schematic configuration of one embodiment of an imaging apparatus capable of performing an image processing method according to the invention. This imaging apparatus 1 is an apparatus for imaging a living specimen S such as cells C carried in a specimen container 10. The specimen container 10 may be called a dish and has a flat shape and an open upper surface. A predetermined amount of a liquid serving as a culture medium M is injected into the specimen container 10. The cells or the like cultured under predetermined culture conditions in this liquid serve as an imaging object of this imaging apparatus 1. The culture medium may be added with an appropriate reagent or may be gelled after being injected in a liquid state into the specimen container 10.

Beside this, for example, a tissue section, a pathological specimen or the like carried in an appropriate carrier may be the imaging object. Further, the specimen container may be a well plate provided with a plurality of wells and a living specimen carried in each well may be the imaging object.

The imaging apparatus 1 includes a holder 11 which holds the specimen container 10, an illuminator 12 arranged above the holder 11, an imager 13 arranged below the holder 11 and a controller 14 which includes a CPU 141 controlling the operation of these components. The holder 11 holds the specimen container 10 in a substantially horizontal posture by being held in contact with a peripheral edge part of the lower surface of the specimen container 10.

The illuminator 12 emits an illumination light toward the specimen container 10 held by the holder 11. For example, a white LED (light emitting diode) may be used as a light source of the illumination light. A combination of the light source and an appropriate illumination optical system are used as the illuminator 12. The imaging object in the specimen container 10 is illuminated by the illuminator 12 from above.

The imager 13 is provided below the specimen container 10 held by the holder 11. In the imager 13, an imaging optical system is arranged at a position right below the specimen container 10. An optical axis of the imaging optical system extends in a vertical direction. FIG.1 shows a side view. An up and down direction of the figure indicates a vertical direction.

By the imager 13, the imaging of the imaging object in the specimen container 10 is performed. Specifically, light emitted from the illuminator 12 and incident on the surface of the liquid from above the specimen container 10 illuminates the imaging object. Light transmitted downward from the bottom surface of the specimen container 10 is incident to a light receiving surface of an imaging element 132 via the imaging optical system of the imager 13 including an objective lens 131. An image of the imaging object formed on the light receiving surface of the imaging element 132 by the imaging optical system is imaged by the imaging element 132. The imaging element 132 is an area image sensor having a two-dimensional light receiving surface. A CCD sensor or a CMOS sensor can be used as the imaging element 132.

The imager 13 is capable of moving in the horizontal direction and the vertical direction by a mechanism controller 146 provided in the controller 14. Specifically, the mechanism controller 146 moves the imager 13 in the horizontal direction by operating a driving mechanism 15 based on a control command from the CPU 141. By doing so, the imager 13 moves relative to the specimen container 10 in the horizontal direction. Further, focusing is performed by moving the imager 13 in the vertical direction.

Further, the as indicated by arrows with dotted lines shown in FIG.1, the driving mechanism 15 moves the illuminator 12 integrally with the imager 13 when the imager 13 is moved in the horizontal direction. Specifically, the illuminator 12 is arranged such that a center of emitted light substantially coincides with the optical axis of the imaging optical system. When the imager 13 moves in the horizontal direction, the illuminator 12 also moves in conjunction with the imager 13. By doing so, whenever the imager 13 moves relative to the specimen container 10, the center of light emitted from the illuminator 12 always positions on the optical axis of the imager 13. Consequently, the illuminating condition becomes constant regardless of which specimen container 10 is to be imaged, wherefore imaging conditions can be maintained to be satisfactory.

The image signal output from the imaging element 132 of the imager 13 is send to the controller 14. The image signal is input to an AD converter (A/D) 143 provided in the controller 14 and converted into digital image data. The CPU 141 functions as an image processor which performs appropriate image processings based on the received image data.

The controller 14 further includes a memory 144 for storing image data and a storage 145 for storing programs to be executed by the CPU 141 and data generated by the CPU 141. The memory 144 can be accessed from the CPU 141 at high speed, but has less storage capacity than the storage 145. The storage 145 includes a hard disk drive (HDD), for example, which has more storage capacity and less access speed than the memory 144. These can be used properly according to the purpose. The CPU 141 performs variable calculation processings described later by executing a control program stored in the storage 145.

Besides, the controller 14 is provided with an interface (I/F) 142. The interface 142 has a function of receiving an operation input from a user and presenting information such as processing results to the user. The controller 14 also has a function of performing data exchange with an external apparatus connected via a communication line. To realize the user interface function, an input receiver 147 for receiving an operation input from the user and a display 148 for displaying the messages to the user, a processing result or the like are connected to the interface 142.

Next, the image processing method using the imaging apparatus 1 configured as described above is described. This image processing method corresponds to one embodiment of the image processing method according to the invention. The purpose of this processing is to automatically extract regions occupied by cells C from a bright field image captured by the imaging apparatus 1 with the cells C planar-cultured (two-dimensionally cultured) along the bottom surface of the container 10 as a specimen S.

Figure 2:
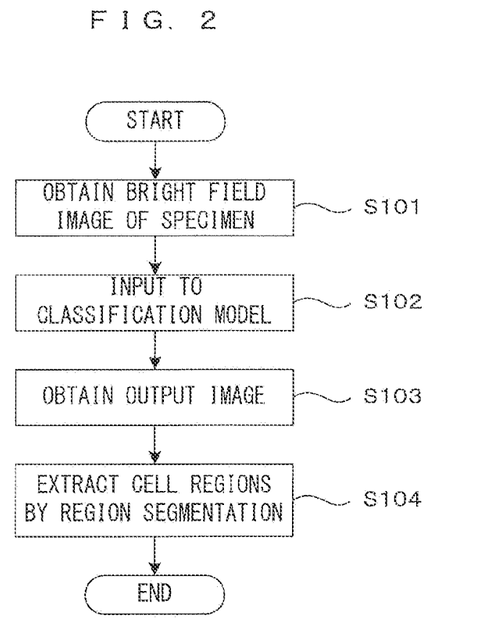
FIG. 2 is a flow chart showing an image processing in the embodiment.

FIG. 2 is a flow chart showing the image processing in this embodiment. This processing is realized by the CPU 141 of the imaging apparatus 1 executing the control program prepared in advance and causing each apparatus component to perform a predetermined operation. First, a bright field image of the specimen S is obtained (Step S101). Specifically, the specimen container 10 in which the cells serving as the specimen S are two-dimensionally cultured is set in the holder 11 of the imaging apparatus 1. The bright field image of the specimen S is obtained by the imager 13 of the imaging apparatus 1 performing imaging while scanning the specimen container 10.

The obtained bright field image is input to a classification model constructed in advance by machine learning (Step S102). Although described in detail later, this learning model has a function of discriminating regions occupied by the cells (hereinafter, referred to as "cell regions") and a region other than the cell regions (hereinafter, referred to as a "background region") from the bright field image input as a test image as a result of machine learning. For example, a mask image for dividing the test image into the cell regions and the background region is output as a result image.

Based on an output image of the classification model, the original bright field image is divided into the cell regions and the background region (Steps S103, S104). That is, only the regions occupied by the cells, out of the bright field image, are extracted by applying the mask image output by the classification model to the original bright field image. In this way, the cell regions and the background region are separated.

Next, the classification model construction method for realizing the image processing is described. Such a classification model is widely used for the purpose of extracting regions having a specific appearance feature from the test image. Various machine learning algorithms for constructing a classification model suited for this purpose are known. Also in this embodiment, one machine learning algorithm can be appropriately selected from those and used. A deep learning algorithm, for which feature amounts used for classification need not be artificially set, can be suitably applied for the analysis of an image of cells having indefinite shapes and having large individual differences. Although a convolutional neural network (CNN) is used as an example here, there is no limitation to this.

The construction of the classification model by machine learning is made by the collection of typical case examples serving as training images, labeling (teaching input) for those training images and the execution of machine learning using these as training data. To this end, it is necessary to collect a multitude of cell images having the same type of features as or similar features to cell images to be classified. For example, if a library of images captured in the past is available, that can be used. However, if a bright field image of planar-cultured cells is a processing object, the following points need to be considered.

Figure 3A:
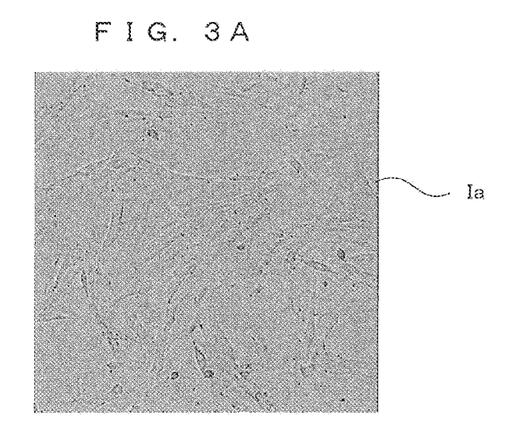
FIGS. 3A to 3C are pictures and a diagram showing examples of bright field images of planar-cultured cells.
Figure 3B:
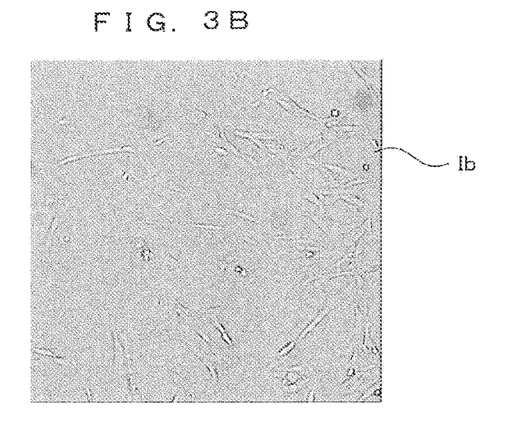
Figure 3C:
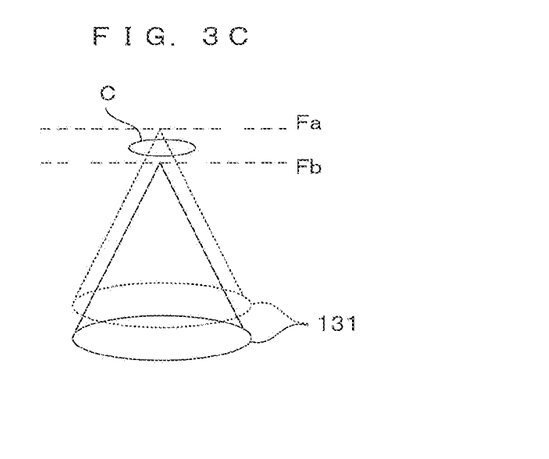

FIGS. 3A to 3C are pictures and a diagram showing examples of bright field images of planar-cultured cells. A focus position with respect to a specimen at the time of imaging is slightly different in FIGS. 3A and 3B. This causes a difference in the image contrast of the cells in the images. Specifically, in an image Ia shown in FIG. 3A, contour (edge) parts of the cells look white, whereas the insides of the cells look blacker. That is, in the image Ia, the contours of the cells have a relatively high luminance and the insides of the cells have a relatively low luminance. On the other hand, contrary to the above, contour parts of the cells look black and the insides of the cells look whiter in an image Ib shown in FIG. 3B. That is, in the image Ib, the contours of the cells have a relatively low luminance and the insides of the cells have a relatively high luminance. Such a difference is thought to be a phenomenon caused by the action of the planar-cultured cells thin and spread along a container wall surface as convex lenses.

As shown in FIG. 3C, the image Ia is an image obtained when imaging is performed with a focal plane Fa of the objective lens 131 located slightly backward of the cell C. Further, the image Ib is an image obtained when imaging is performed with a focal plane Fb of the objective lens 131 located slightly forward of the cell C. Strictly speaking, these states are deviated from a focusing condition with respect to the cell C, but both are suitable for the observation of the cell C. This is because the visibility of the cell C is rather low in an image in a perfectly focused state since the cell C is nearly transparent and the image of the cell C more clearly appears when the focus position is slightly deviated as in these images Ia, Ib.

As just described, two types of images having mutually different contrast states are usable as bright field images suitable for the observation of two-dimensionally cultured cells. Specifically, in an image in the first contrast state, contour parts of cells have a high luminance and center parts have a low luminance as in the image Ia shown in FIG. 3A. On the other hand, in an image in the second contrast state, contour parts of cells have a low luminance and center parts have a high luminance as in the image Ib shown in FIG. 3B. There is basically no difference in quality between these and an appropriate one is selected mainly according to an observer's taste and purpose, an environment at the time of imaging and the like.

Images in such two kinds of contrast states are possibly included in case examples collected as candidates for training images. There are possibly cases biased toward images in either one of the contrast states and cases where images in the both contrast states are mixed. Further, test images serving as image processing objects are also possibly in the two contrast states.

Training images are desirably images captured in the same contrast state as the test image. However, particularly in the case of using a library of images captured in the past, a necessary number of only such case examples cannot be always collected. An operation of distinguishing a multitude of images by the contrast states of the images is a large burden on an operator. Further, if a test image is an image captured in the contrast state different from that of the training image, sufficient classification accuracy cannot be obtained. Furthermore, the two contrast states are possibly mixed in a single image depending on the positions of the cells in the specimen S, an imaging environment and the like.

From these, substantially the same number of images captured in the two contrast states are preferably included as training images used as training data. However, it remains unchanged that a necessary number of such images cannot be always collected.

Accordingly, the inventors of this application got the following idea, focusing on such a feature that the image contrast of the cells is symmetrical in the two types of images described above. That is, by reversing the contrast of the image collected as the training image, an image in the other contrast state can be generated in a pseudo manner from an image in one contrast state. By using the both images in the two kinds of contrast states obtained in this way as training images, case examples serving as training images can be made abundant.

By using the images in the two kinds of contrast states collected in this way as the training images, it is expected to be possible to construct a classification model having equal classification accuracy for test images in the both contrast states, i.e. excellent in generalization performance. By a verification experiment of the inventors of this application, it was confirmed that a classification model having sufficient classification accuracy for test images in either contrast state could be obtained by using training images generated in a pseudo manner in this way. A specific method for constructing such a classification model is described below.

Figure 4:
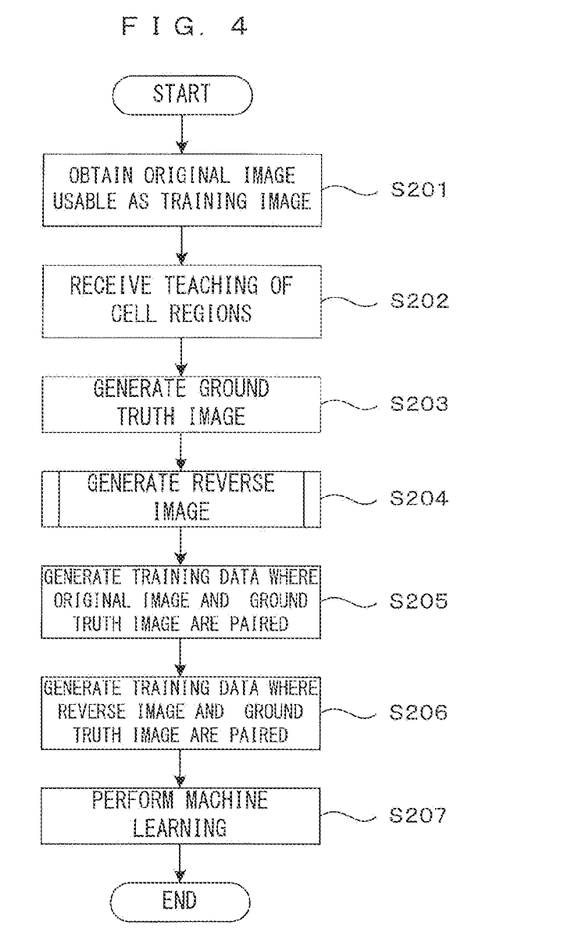
FIG. 4 is a flow chart showing a classification model construction method in the embodiment.
Figure 5:
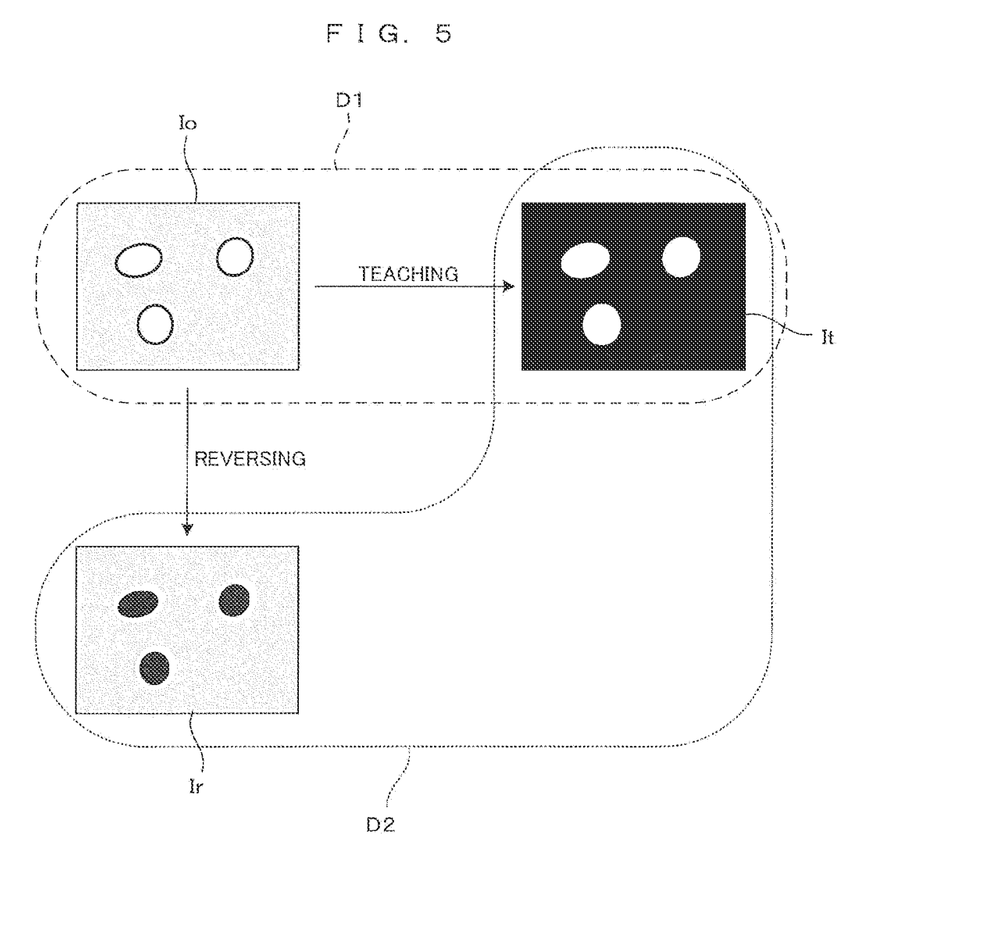
FIG. 5 is a view schematically showing a relationship of an original image, a reverse image and a ground truth image.

FIG. 4 is a flow chart showing a classification model construction method in this embodiment. Further, FIG. 5 is a view schematically showing a relationship of an original image, a reverse image and a ground truth image. This processing can be realized by the CPU 141 of the imaging apparatus 1 executing the control program prepared in advance. However, if new imaging for obtaining training images is not accompanied, this processing can be performed by a general-purpose computer device having a general hardware configuration. Since a high computational power is necessary to execute a machine learning algorithm, a computer device with higher performance than the controller 14 provided in the imaging apparatus 1 is desirably used.

First, an original image Io usable as a training image is obtained (Step S201). A bright field image of the same kind of cells as the specimen S as an image processing object can be used as the original image Io, but the contrast state at the time of imaging does not matter. That is, the contrast state may be either of the first contrast state and the second contrast state and only one of these contrast states may be present or both of these contrast states may be mixed. A ratio of these contrast states is also arbitrary. Cells in the original image Io are more preferably two-dimensionally cultured cells as in the specimen S. The original image Io may be newly captured by the imaging apparatus 1 or may be obtained from an image library collecting images captured in the past.

Subsequently, a teaching input from a user for the original image Io is received (Step S202). This teaching input is an operation for labeling regions occupied by the cells, out of the image. For example, the original image Io is displayed on the display unit 148 and the teaching input can be received by a user input via the input receiver 147.

A ground truth image It is generated based on a teaching result (Step S203). The ground truth image It is an image obtained by expressly dividing the original image Io into cell regions occupied by the cells and a background region other than the cell regions. For example, an image in which luminance is binarized in the cell regions and the background region can be used as the ground truth image It. Such a binarized image can be used as a mask image in extracting only the cell regions (or the background region) from the original image Io.

Subsequently, a reverse image Ir is generated based on the original image Io (Step S204). The reverse image Ir is an image obtained by reversing the luminance of each pixel to change image contrast at least for the cell regions in the original image Io. A specific processing method for that is described later. If the original image Io is an image captured in the first contrast state, the reverse image Ir expresses an image, which would be obtained by imaging the same cells in the second contrast state, in a pseudo manner. On the other hand, if the original image Io is an image captured in the second contrast state, the reverse image Ir expresses an image, which would be obtained by imaging the same cells in the first contrast state, in a pseudo manner. By this processing, sets of the original image Io and the ground truth image It and the reverse image Ir corresponding to the original image Io are generated. By performing a similar processing for each of a plurality of collected original images Io, a plurality of sets of the original image Io and the ground truth image It and the reverse image Ir corresponding to the original image Io are generated.

The original image Io and the reverse image Ir are both used as training images and the training images are made abundant in this way. Specifically, the original image Io and the ground truth image It corresponding thereto are paired to generate one set of training data D1 (Step S205). Further, the reverse image Ir and the ground truth image It corresponding thereto are paired to generate another set of training data D2 (Step S206). The original image Io and the reverse image Ir are images obtained by imaging the same cells in the same field of view and in mutually different contrast states. Therefore, the cell regions taught in the original image Io automatically also teach the cell regions in the reverse image Ir. That is, the ground truth image It corresponding to the original image Io is handled as a ground truth image also for the reverse image Ir.

As just described, two training images (original image Io and reverse image Ir) are prepared from one original image Io, and a teaching operation only has to be performed for one image. Therefore, a workload of the user is not increased in enriching the training data.

Machine learning using an appropriate learning algorithm is performed based on the training data prepared in this way (Step S207). As described above, a learning algorithm based on the principle of deep learning can be suitably applied. Further, a known semantic segmentation method can be, for example, applied as a method for dividing an image into regions.

The classification model constructed by the above processing has a function of dividing a test image in either of the first and second contrast states into cell regions and a background region. In the case of using a binarized mask image as a ground truth image, an output image of the classification model is also a mask image for dividing the test image into the cell regions and the background region. By applying this mask image to the test image and performing an appropriate image processing, the cell regions and the background region in the test image can be distinguished.

The image processing in this case includes a processing of extracting either the cell regions or the background region from the image, a processing of imparting different visual effects (e.g. color coding) for the cell regions and the background region, a processing of enhancing the contours of the cell regions and the like, but processing contents are not limited to these.

Next, several case examples of a processing of generating a reverse image from an original image (Step S204 of FIG. 4) are described with reference to FIGS. 6 to 8. Although four specific case examples are described here, a similar result can be obtained by any example for the purpose of generating a pseudo training image from an original image.

Figure 6:
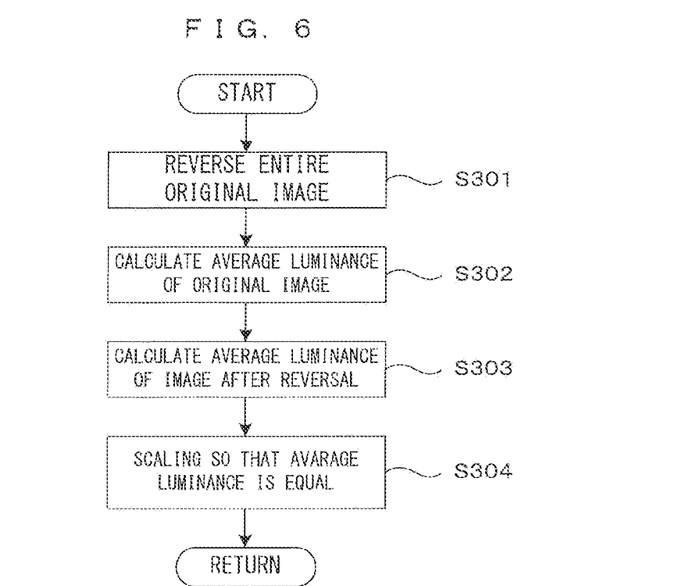
FIG. 6 is a flow chart showing a first case example of a reverse image generation processing.

FIG. 6 is a flow chart showing a first case example of the reverse image generation processing. In this case example, the luminance of the entire original image is reversed (Step S301). In this way, the image contrast of the cell regions is reversed. However, since the background region is also reversed, the density of the entire image may largely differ from an actual one. Accordingly, an average luminance is calculated for each of the original image and an image after reversal (Steps S302, S303). A luminance value of each pixel constituting the image after reversal is so scaled that the both average luminances substantially coincide (Step S304). In this way, the reverse image is generated.

In this processing, the cell regions and the background region in the original image are not distinguished. Thus, after the original image is obtained, the reverse image can be immediately generated without waiting for a teaching input. In contrast, it is assumed in each case example described below that the cell regions and the background region in the original image are distinguished. Since such a distinction is possible by a teaching input from the user in this embodiment, the processing assuming that can be adopted.

Figure 7:
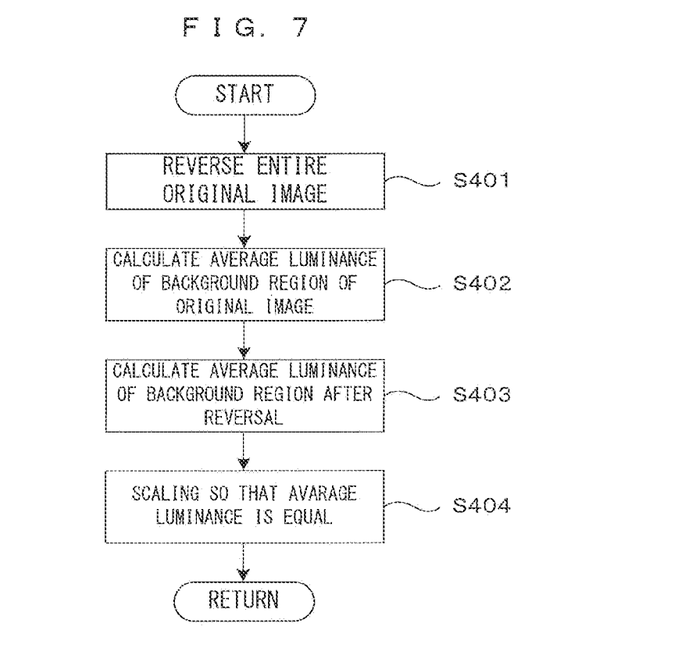
FIG. 7 is a flow chart showing a second case example of the reverse image generation processing.

FIG. 7 is a flow chart showing a second case example of the reverse image generation processing. Also in this case example, the luminance of the entire original image is reversed (Step S401). However, luminance scaling is performed only for the background region. That is, an average luminance is calculated for the background region of each of the original image and an image after reversal (Steps S402, S403). A luminance value of each pixel constituting the background region of the image after reversal is so scaled that the both average luminances are substantially equal (Step S404). In this way, the reverse image is generated.

The image contrast is merely reversed in the cell regions by luminance reversal, but the total luminance largely changes in the substantially uniform background region. However, a background density does not largely change due to a slight difference in the setting of the focus position in actual imaging. In view of this, only the luminance of the background region after reversal is scaled in this case example. In this way, the image contrast in the cell regions is maintained. Further, since the luminance of the background region in the reverse image is not affected by the luminance of the cell regions, a luminance difference of the background region before and after reversal can be reduced.

Next, a third case example of the reverse image generation processing is described. In this case example, luminance is reversed only in regions taught as cell regions, out of an original image. Accordingly, there is no change in a background region also in an image after reversal and the image after reversal can be directly used as a reverse image without performing scaling. Since this processing is merely for reversing the luminance of cell regions, a flow chart is not shown.

Figure 8:
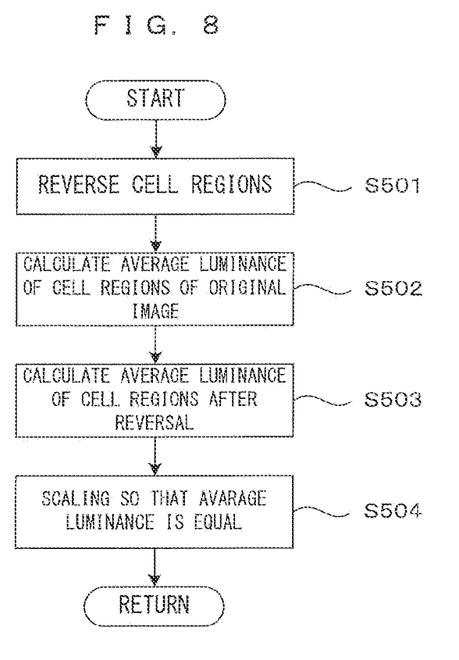
FIG. 8 is a flow chart showing a fourth case example of the reverse image generation processing.

FIG. 8 is a flow chart showing a fourth case example of the reverse image generation processing. In this case example, luminance is reversed only in cell regions as in the third case example (Step S501) and the luminance of a background region is not changed. However, image contrast is adjusted by scaling the luminance of the cell regions after reversal. That is, an average luminance of the cell regions in each of an original image and an image after reversal is calculated (Steps S502, S503). A luminance value of each pixel constituting the cell regions after reversal is so scaled that the both average luminances are substantially equal (Step S504).

Depending on a state of the cells and imaging conditions such as illumination, the luminance of the cell regions or the image contrast possibly become unnatural if mere reversal is performed. By scaling the cell regions after reversal, such a problem can be solved.

Any one of these case examples may be used as the processing of generating the reverse image in Step S204 (FIG. 4). Further, a configuration capable of switching and performing these may be adopted if necessary. For example, a processing method may be selected by a user operation. Note that although scaling in each of the above case examples is based on the average values of the luminance, this is an example. For example, scaling may be performed based on median values of the luminance, scaling based on a luminance difference (or contrast value) between the cell regions and the background region or the like may be performed.

Figure 9A:
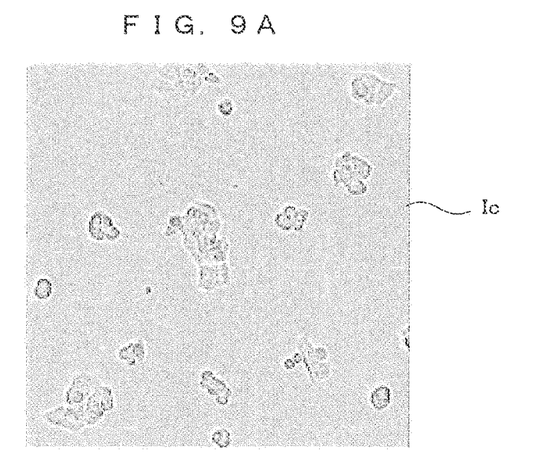
FIGS. 9A and 9B are pictures showing case examples of an original image and a reverse image.
Figure 9B:
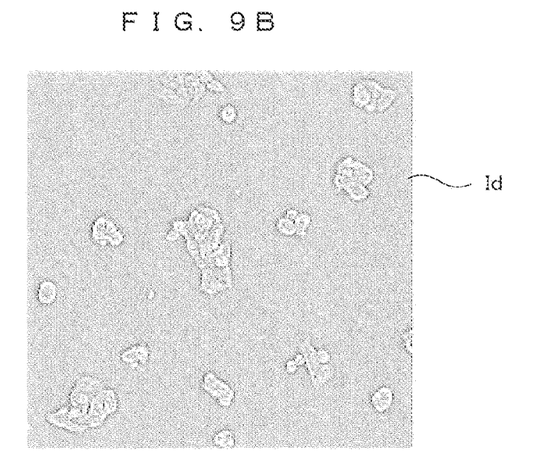

FIGS. 9A and 9B are pictures showing case examples of an original image and a reverse image. An image Ic shown in FIG. 9A is an original image and captured in the first contrast state in which contour parts of cells are bright and the insides of the cells look darker. On the other hand, an image Id shown in FIG. 9B is an example of a reverse image generated from the image Ic by the method of the first case example (FIG. 6) described above. It can be understood that image contrast is reversed since contour parts of cells are dark and the insides of the cells are bright. On the other hand, the density of the background image is hardly different from that of the original image Ic. This image Id expresses an image, which would be obtained by imaging in the second contrast state, in a pseudo manner.

Figure 10A:
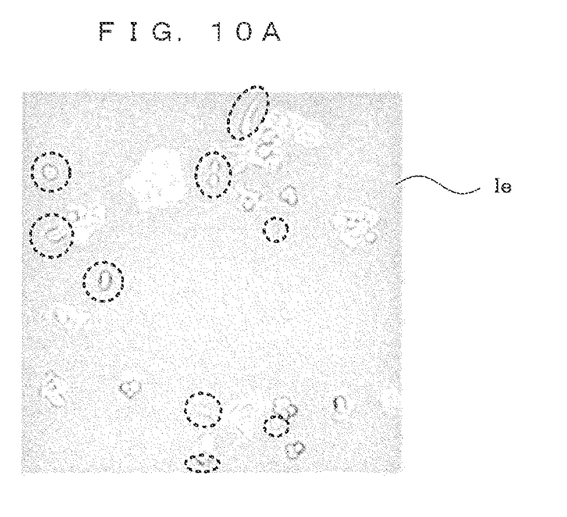
FIGS. 10A and 10B are pictures showing examples of a cell region extraction result by the embodiment.
Figure 10B:
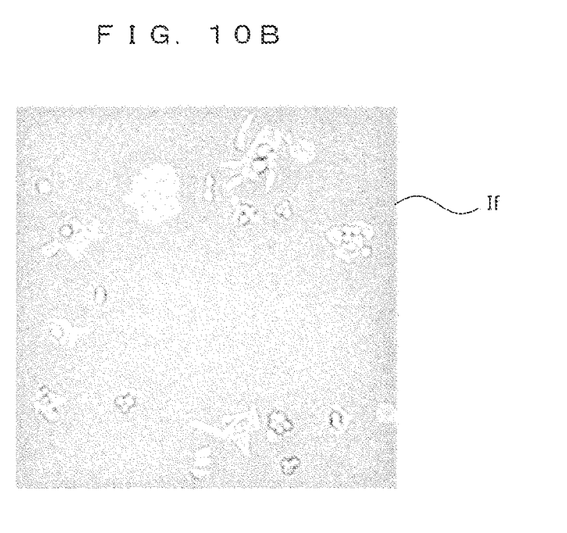

FIGS. 10A and 10B are pictures showing extraction result examples of cell regions by this embodiment. FIG. 10A shows a comparative example. An image Ie as this comparative example shows one result of extraction of cell regions. In this example, a classification model is constructed using only images captured in the first contrast state as training images. On the other hand, an inputted image as a test image is obtained by imaging in the second contrast state. Although a plurality of cells are distributed in the image Ie, parts enclosed by dotted lines were not extracted as the cell regions. It is indicated that there is a deviation between an actual image and the extraction result and extraction accuracy is not sufficient, such as because the entire cells are excluded from extraction objects and partial regions of the cells are not extracted.

On the other hand, an image If shown in FIG. 10B shows an extraction result by a classification model constructed using both original images and reverse images generated from the original images as training images. Regions occupied by cells in an image and the extracted regions coincide well and extraction accuracy is understood to be improved.

As described above, in the image processing of this embodiment, the classification model for analyzing a bright field image of planar-cultured (two-dimensionally cultured) cells and extracting cell regions occupied by the cells is constructed by machine learning using both collected original images and reverse images generated from the collected original images as training images. This configuration has the following advantages.

Firstly, the generalization performance and classification accuracy of the classification model can be improved by making the case examples serving as training images abundant. Specifically, regardless of in which of the first and second contrast states an image of cells as an image processing object is captured, cell regions can be accurately extracted from that image.

Secondly, in performing this image processing, it is not necessary to distinguish in which contrast state the image was captured. This further includes the plurality of meanings.

First, regardless of in which contrast state a teacher image was captured, the image contributes to making case examples abundant. Accordingly, there may be a deviation in a ratio of the contrast states among the collected images. In extreme cases, the collected images may be only images in either one of the contrast states. The contrast state at the time of imaging is often selected according to an observer's taste. Thus, for example, images collected in one research facility may be biased toward either one of the contrast states. Even in such a situation, case examples can be made abundant by generating images corresponding to those in the other contrast state in a pseudo manner and using such images as training images together with original images. This advantageously acts, for example, when a library of images captured in the past are used as training images.

Further, it is not necessary to distinguish in which contrast state each of the collected images was captured. Even if images in two contrast states are mixed, those images need not be distinctly handled when being used as training images and a technique and time and effort therefor are also unnecessary. Therefore, the collected images can be used as training images without waste and without time and effort.

It does not matter in which contrast state an image serving as an image processing object is captured. Accordingly, the user can perform imaging in the contrast state suited for the purpose or favorite without paying attention to a circumstance for the image processing. Further, even if an already captured image is a processing object, a good processing result can be obtained regardless of in which contrast state that image was captured and without the user needing to be conscious thereof.

Further, even if images in two contrast states are mixed in a single image, this image can be used as an original image or a processing object image of this embodiment. An image in which such two contrast states are mixed is possibly obtained due to the positions of cells in the container, inclination between the container and an optical axis at the time of imaging and the like. Such an image also can be used as a training image and a test image without problem.

A third advantage of the image processing of this embodiment is that a user's burden is not increased in making case examples abundant. Besides that it is not necessary to distinguish the contrast states of the collected images as described, image reversal can be performed as an automatic processing. Further, a teaching input for the original image can be directly applied also to the reverse image. Therefore, an operation to be substantially done by the user is not increased at all.

Note that the invention is not limited to the embodiment described above and various changes other than the aforementioned ones can be made without departing from the gist of the invention. For example, the imaging apparatus 1 of the above embodiment images the specimen S by scanning the imager 13 with respect to the specimen container 10. However, the imaging method is not limited to this. For example, an image captured using an optical microscope may be used as at least one of an original image and a test image. Further, in the above embodiment, illumination light is incident from above the specimen S and imaging is performed by the light transmitted downward. However, without limitation to these, illumination and imaging directions are arbitrary as long as a bright field image can be obtained.

Further, in the embodiment, for example, a teaching input for teaching cell regions to an obtained original image is received and the original image is labeled. However, for example, if an image, for which the teaching operation was performed in the past, is already available, that image and the teaching result may be used. In this case, the teaching input can be omitted at least for such an image.

Further, in the above embodiment, the image processing of the invention is performed by the imaging apparatus 1 configured to image cells. However, the image processing of the invention can also be performed by an apparatus not having an imaging function itself, e.g. a computer device such as personal computer or a work station. In this case, images can be obtained from outside via the interface unit 142 and an electrical communication line or via an appropriate recording medium. The invention can be carried out as a control program for causing the computer device to perform each process of the image processing method or classification model construction method according to the invention or a recording medium non-temporarily storing this program.

Further, in the above embodiment, a bright field image of planar-cultured cells is used as a processing object. However, besides this, the image processing of this embodiment can be applied to such a specimen in which two kinds of contrast states appear by the action of the cells as thin lenses as above.

As the specific embodiment has been illustrated and described above, a reverse image can be, for example, generated by reversing luminance of each pixel of an original image and scaling a luminance value of each pixel such that an average luminance is equal to that of the original image in the image processing method and classification model construction method according to the invention. Further, the reverse image may be, for example, an image generated by reversing the luminance of each pixel of the original image and scaling the luminance value of each pixel such that an average luminance in a region other than the cell regions is equal to that of the original image.

Further, the reverse image may be, for example, generated by reversing the luminance of each pixel in the taught cell regions, out of the original image. In this case, the luminance value of each pixel in the cell regions in the reverse image may be so scaled that the average luminance of the cell regions after reversal is equal to that of the cell regions in the original image. According to these methods, it is possible to generate a reverse image, which will become a training image contributable to an improvement in the generalization performance and classification accuracy of the classification model.

Here, the classification model can be constructed by deep learning. Cell images have indefinite shapes and large individual differences. A deep learning algorithm, for which a feature noted for classification needs not be artificially determined, is suitable for the analysis of images having such a property.

Further, for example, a step may be further provided in which a bright field image of two-dimensionally cultured cells is input as a test image to the constructed classification model and an output image of the classification model is obtained. In the invention configured in this way, regardless of in which contrast state a test image was captured, cell regions can be accurately extracted from the test image. Therefore, a user can select the contrast state at the time of imaging according to his/her taste or purpose without being conscious of the classification accuracy in the classification model.

Further, a step of dividing a test image into cell regions and a region other than the cell regions based on an output image of the classification model may be provided in the image processing method according to this invention. According to such a configuration, if an image of cells is prepared, that image can be automatically divided into cell regions and a region other than the cell regions.

Further, for example, an original image can be an image obtained by imaging a specimen in which the same kind of cells as those, for which a test image is captured, are two-dimensionally cultured. According to such a configuration, a highly accurate classification model can be constructed by using images captured under conditions similar to those for images of cells to be processed as training images.

This invention can be particularly suitably applied for the purpose of observing and evaluating an optical image of cultured cells, for example, in fields of medicine/bioscience.

Although the invention has been described with reference to specific embodiments, this description is not meant to be construed in a limiting sense. Various modifications of the disclosed embodiment, as well as other embodiments of the present invention, will become apparent to persons skilled in the art upon reference to the description of the invention. It is therefore contemplated that the appended claims will cover any such modifications or embodiments as fall within the true scope of the invention.

What is claimed is:

1. An image processing method, comprising:
   obtaining a ground truth image teaching a cell region occupied by a cell in an original image for each of a plurality of the original images obtained by bright-field imaging of the cell;
   generating a reverse image by reversing luminance of the original image at least for the cell region based on each original image; and
   constructing a classification model by performing machine learning using a set of the original image and the ground truth image corresponding to the original image and a set of the reverse image and the ground truth image corresponding to the original image as a basis of the reverse image respectively as training data.

2. The image processing method according to claim 1, wherein the reverse image is generated by reversing the luminance of each pixel of the original image and scaling a luminance value of each pixel such that an average luminance of the reverse image is equal to an average luminance of the original image.

3. The image processing method according to claim 1, wherein the reverse image is an image generated by reversing the luminance of each pixel of the original image and scaling a luminance value of each pixel such that an average luminance in a region other than the cell regions of the reverse image is equal to an average luminance in a region other than the cell regions of the original image.

4. The image processing method according to claim 1, wherein the reverse image is generated by reversing the luminance of each pixel in the cell regions which is taught, out of the original image.

5. The image processing method according to claim 4, wherein a luminance value of each pixel in the cell regions in the reverse image is so scaled that an average luminance of the cell regions after reversal is equal to an average luminance of the cell regions in the original image.

6. The image processing method according to claim 1, wherein the classification model is constructed by deep learning.

7. The image processing method according to claim 1, further comprising:
   inputting a bright field image of two-dimensionally cultured cells as a test image to the classification model which is constructed; and
   outputting an output image from the classification model.

8. The image processing method according to claim 7, wherein a test image is divided into cell regions and a region other than the cell regions based on the output image of the classification model.

9. The image processing method according to claim 7, wherein the original image is an image obtained by imaging a specimen in which a same kind of cells as cells contained in the test image are two-dimensionally cultured.

10. A classification model construction method for specifying regions occupied by two-dimensionally cultured cells from a bright field image of the cells, the classification model construction method comprising:
   obtaining a ground truth image teaching cell regions occupied by cells in an original image for each of a plurality of the original images obtained by bright-field imaging of the cells;
   generating a reverse image by reversing luminance of the original image at least for the cell regions based on each original image; and
   constructing a classification model by performing machine learning using a set of the original image and the ground truth image corresponding to the original image and a set of the reverse image and the ground truth image corresponding to the original image as a basis of the reverse image respectively as training data.

* * * * *